UNITED STATES PATENT OFFICE.

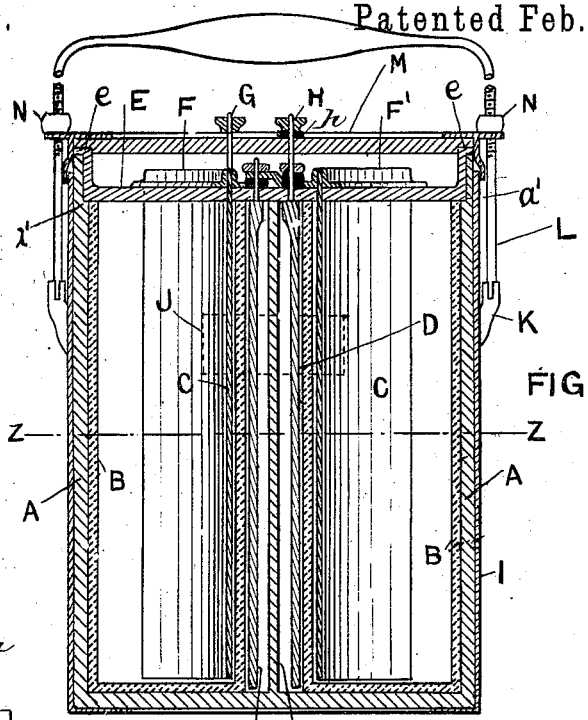

EDWARD BURNET, OF WIGAN, ENGLAND.

ELECTRICAL BATTERY.

SPECIFICATION forming part of Letters Patent No. 577,282, dated February 16, 1897.

Application filed November 30, 1895. Serial No. 570,577. (No model.)

*To all whom it may concern:*

Be it known that I, EDWARD BURNET, a subject of the Queen of Great Britain, residing at Wigan, in the county of Lancaster, in the Kingdom of England, have invented certain new and useful Improvements in Electrical Batteries, of which the following is a specification.

This invention has for its object a battery or compound cell applicable for a pocket electric lamp. The invention is, however, applicable to almost all kinds of electric batteries, both primary and secondary.

The great desideratum of a pocket electric battery is that the liquids shall not upset or creep and that the fumes, if there be any, shall not escape, and that the terminals and connections shall be quite clear of the electrolytes and there shall be no communication between the two.

My invention is best described by aid of the accompanying drawings, in which—

Figure 1 is a section of my battery for a pocket electric lamp with case. Fig. 1ª is a detail view of upper portion of one of the carbons; Fig. 2, a section on the line Z Z; Fig. 3, a plan of top of battery, the case being removed; Fig. 4, a plan of lid and bottom of case.

Referring first to the battery proper, A is a double cell formed of ebonite or other suitable material and having a diaphragm $a$.

B B are porous cups fitting with the compartments of cell A. These cups are of the same height as the diaphragm $a$ and the rabbet $a'$, hereinafter described.

C C are carbons of segmental circular cross-section and somewhat smaller in diameter than the porous cups, so as to allow the electrolyte to freely circulate round them.

D D are the zincs, also made in section, a segment of a circle. It is obvious, however, that if the porous cells be of other form than circular these carbons and zincs must be of similar contour, so as to allow the two to approach together as near as practicable to keep down the internal resistance.

E is a tray of ebonite or other like material closely fitting into the socket in the top of cell A, formed by the cut-out portion or rabbet $a'$. This tray has a flange $e$, projecting over the top edge of cell A and fitting closely on it, and curved slots for the upper ends of carbons C to pass through. The joint between this tray and the cell can be made with paraffin or other waterproof composition not acted upon by the electrolytes in the cell.

F is a cap of brass or other metal. This cap fits on the top of one of the carbons. The carbon is plated with copper or other negative metal near the top—in fact, for the length covered by the cap and a short distance below. The cap is brazed or sweated onto the coppered portion and is screwed down to the tray and a water-tight joint made between. Further, the crack round the carbon in the tray is filled with paraffin, bitumen, or the like. The copper plating immediately below the cap is then scraped away for a short distance, leaving, however, a band coppered below the portion thus bared. The space bared above the further belt of copper plating is covered and saturated with paraffin. The coppering below, however, which is not covered by the paraffin, prevents the paraffin from creeping down onto the portion of the carbon in the cell.

The top of the cap of one of the carbons is connected to the terminal G by a metallic connection. The connection F' is another similar cap on the other carbon, formed with a projecting plate for connecting with the zinc of the other couple, so as to connect up in series. A large hole in the projecting plate of cap F' is left round the binding-post of the nearest zinc, in which hole insulating material is placed to prevent any connection between that zinc and the cap. That zinc is connected by its metallic connection or binding-post with terminal H, the crack between the zinc and the metallic plate being filled with paraffin or bitumen, as in the case of the crack round the carbon, and the terminal of the zinc is screwed into a thickened portion on the top and screwed down to the lid by means of a nut with preferably an india-rubber washer $h$ below, so as to completely close the aperture round the connection. There can be two screws, if desirable, fixed in this way, so as to hold the zinc perfectly rigid, one of them only being used as a terminal.

I is the metallic case for protecting the battery in the pocket and for carrying it about.

J (shown in dotted lines) is a lug brazed or riveted to the case for the purpose of hooking a lamp-bulb holder on.

K is a lug to which the handle L is secured.

M is a lid. This and the bottom of the case have a part cut away, as shown in the plan, to diminish the weight and provide a ready means of removing the cell by pushing up from the bottom with the fingers. The lid is held down by the nuts N.

Any suitable electrolyte may be employed in the cell, but I prefer to employ a solution of sulfuric acid and water for the excitant, and a mixture of chromic acid, hydrochloric-acid solution, and potassium chlorate for the depolarizer.

It is obvious that this form of cell, especially the tray, whereby it is made absolutely water-tight, can be used for any kind of battery whatsoever, whether primary or secondary, and is a great advantage, as all the connections are in a chamber absolutely protected from the creeping of the salts of the electrolyte from the liquid and from gases. The peculiar arrangement, too, of the partially-circular plates enables one to form a battery of very small resistance in a very small space. The lid, too, being pressed down by means of the nuts N in the cover, holds the porous cells tightly in position, while the manner in which the electrodes are fixed in place enables the battery to be subjected to comparatively a rough shaking without any disturbance of the relative positions of the parts.

I declare that what I claim is—

1. In a battery, the combination of a cell formed with a socket in its upper opened end, with the electrodes, and a tray supporting the electrodes and closely fitting within the socket and having a flange extending over the walls of the cell to prevent leakage into the tray, substantially as described.

2. The combination of the cell having a socket or rabbet at top, the electrodes, the tray supporting the electrodes, and closely fitting within the socket and formed with a flange which projects over and hermetically seals the top of the cell, the lid fitting closely upon the flange of the tray, and suitable connections and terminals above the tray connected through it and the lid, whereby the connections are protected from the contents of the cell, substantially as described.

3. The herein-described method of treating battery-carbons for preventing the creeping or spreading of paraffin, which consists in plating or forming upon the carbons adjacent to one end a band or ribbon of negative metal, and then paraffining the end of the carbon above the plated portion, leaving the plated portion and the part below free of paraffin, substantially as set forth.

4. The herein-described method of treating carbons for preventing the creeping or spreading of paraffin, which consists in plating the upper ends of the carbons, removing a strip or portion of the plating, and paraffining the upper end of the carbon and the portion from which the plating has been removed, substantially as set forth.

5. The herein-described method of preparing battery-carbons which consists in plating the upper end of the carbon, brazing a metal cap or plate to the plated end of the carbon, removing a strip or portion of the plating from the carbon beneath the metal cap or strip, and finally immersing the capped end of the carbon in paraffin up to and including the portion from which the plating has been removed, substantially as set forth.

6. A battery-carbon having a metallic cap or plate secured to its upper end, a portion plated with a negative metal below the cap portion, and paraffin above the plated portion, as set forth.

7. In a battery, the combination of the double cell, the tray supported in the cell, the carbons supported from and extending through the tray, the cap-pieces F F' secured to the upper ends of the carbons, the terminals G, H electrically connected with the cap-pieces, and an extension from cap-piece F' to one of the zincs, substantially as set forth.

In testimony whereof I have signed my name to this specification in the presence of two subscribing witnesses.

EDWARD BURNET.

Witnesses:
 JOSHUA UNSWORTH,
 JOSEPH RICHARD PORTER.